US008984730B2

(12) United States Patent
Holmes et al.

(10) Patent No.: US 8,984,730 B2
(45) Date of Patent: Mar. 24, 2015

(54) SYSTEM AND METHOD FOR ROTATING A TURBINE SHELL

(75) Inventors: James Bradford Holmes, Fountain Inn, SC (US); Randall Stephen Corn, Travelers Rest, SC (US)

(73) Assignee: General Electric Company, Schenectady, NY (US)

( * ) Notice: Subject to any disclaimer, the term of this patent is extended or adjusted under 35 U.S.C. 154(b) by 632 days.

(21) Appl. No.: 13/367,740

(22) Filed: Feb. 7, 2012

(65) Prior Publication Data

US 2013/0199009 A1 Aug. 8, 2013

(51) Int. Cl.

| | |
|---|---|
| ***B25B 27/14*** | (2006.01) |
| ***G01B 11/14*** | (2006.01) |
| ***B23Q 7/00*** | (2006.01) |

(52) U.S. Cl.

USPC ............ 29/281.4; 356/625; 29/281.6; 29/559

(58) Field of Classification Search

USPC ....................... 29/281.4, 281.6, 559; 356/625

See application file for complete search history.

(56) References Cited

U.S. PATENT DOCUMENTS

| | | | | |
|---|---|---|---|---|
| 3,746,268 | A * | 7/1973 | Kastrinos | 241/179 |
| 4,382,678 | A * | 5/1983 | Thompson et al. | 356/150 |
| 4,645,412 | A | 2/1987 | Fujita et al. | |
| 5,085,557 | A | 2/1992 | Koltookian | |
| 5,316,436 | A | 5/1994 | Main et al. | |
| 5,411,306 | A | 5/1995 | Campbell et al. | |
| 5,980,420 | A * | 11/1999 | Sakamoto et al. | 476/10 |
| 6,189,211 | B1 | 2/2001 | Suter | |
| 6,217,473 | B1 * | 4/2001 | Ueda et al. | 475/216 |
| 6,224,332 | B1 | 5/2001 | Leach et al. | |
| 6,792,688 | B2 | 9/2004 | Busch et al. | |
| 7,032,279 | B2 | 4/2006 | McCarvill et al. | |
| 8,448,888 | B2 * | 5/2013 | Smith et al. | 241/178 |
| 8,636,449 | B2 * | 1/2014 | Hynous et al. | 408/1 R |
| 2008/0232963 | A1 * | 9/2008 | Durocher et al. | 416/1 |
| 2010/0110450 | A1 * | 5/2010 | Corn et al. | 356/625 |
| 2010/0163705 | A1 | 7/2010 | Sassatelli et al. | |
| 2010/0223789 | A1 | 9/2010 | Coffey et al. | |
| 2014/0033734 | A1 * | 2/2014 | Lockhart et al. | 60/796 |

* cited by examiner

*Primary Examiner* — Lee D Wilson
*Assistant Examiner* — Alvin Grant
(74) *Attorney, Agent, or Firm* — Dority & Manning, PA

(57) ABSTRACT

A system for rotating a turbine shell includes a first platform and a first trunnion rotatably connected to the first platform. A second platform is separated from the first platform, and a second trunnion is separated from the first trunnion and rotatably connected to the second platform. The system further includes structure for rotating the first trunnion.

20 Claims, 7 Drawing Sheets

SYSTEM AND METHOD FOR ROTATING A TURBINE SHELL

FIELD OF THE INVENTION

The present invention generally involves a system and method for rotating a turbine shell.

BACKGROUND OF THE INVENTION

Turbines are widely used in industrial and commercial operations. For example, a typical commercial steam or gas turbine used to generate electrical power includes a turbine shell or casing that generally surrounds alternating stages of rotating blades and stationary vanes to contain high temperature and pressure steam or combustion gases flowing through the turbine. The turbine shell may weigh several hundred thousand pounds and often includes multiple pieces bolted together to facilitate manufacture, installation, maintenance of the turbine.

Removal of the turbine shell for maintenance or repairs requires heavy duty equipment and space around the turbine that may not always be available. For example, one or more cranes equipped with slings or hooks may be required to lift the turbine shell above the turbine and rotate the turbine shell to facilitate access to the underside of the turbine shell for maintenance or repairs. Oftentimes, the rotation of the turbine shell entails multiple, iterative steps of partially rotating the turbine shell, disconnecting some of the crane hooks, reconnecting the crane hooks to the partially rotated turbine shell, and rotating the turbine shell further. In addition to being time-consuming, the awkward rotation of such a heavy component while being suspended from cranes creates a substantial risk of damage to personnel and equipment. Therefore, an improved system and method for rotating a turbine shell that reduces the required time and/or risk to personnel and/or equipment would be useful.

BRIEF DESCRIPTION OF THE INVENTION

Aspects and advantages of the invention are set forth below in the following description, or may be obvious from the description, or may be learned through practice of the invention.

One embodiment of the present invention is a system for rotating a turbine shell. The system includes a first platform and a first trunnion rotatably connected to the first platform, wherein the first trunnion is adapted to connect to a first portion of the turbine shell. A second platform is separated from the first platform, and a second trunnion is separated from the first trunnion and rotatably connected to the second platform, wherein the second trunnion is adapted to connect to a second portion of the turbine shell. The system further includes means for rotating the first trunnion.

Another embodiment of the present invention is a system for rotating a turbine shell that includes a first platform, a first roller on the first platform, and a first trunnion rotatably engaged with the first roller, wherein the first trunnion is adapted to connect to a first portion of the turbine shell. A second platform is separated from the first platform, with a second roller on the second platform. A second trunnion separated from the first trunnion is rotatably engaged with the second roller, wherein the second trunnion is adapted to connect to a second portion of the turbine shell. A first motor is operably connected to rotate the first trunnion.

The present invention may also include a method for rotating a turbine shell that includes connecting a first trunnion to a first portion of the turbine shell, wherein the first trunnion is rotatably connected to a first platform. The method further includes connecting a second trunnion to a second portion of the turbine shell, wherein the second trunnion is rotatably connected to a second platform and wherein the second trunnion is separated from said first trunnion, and rotating the first trunnion to rotate the turbine shell.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
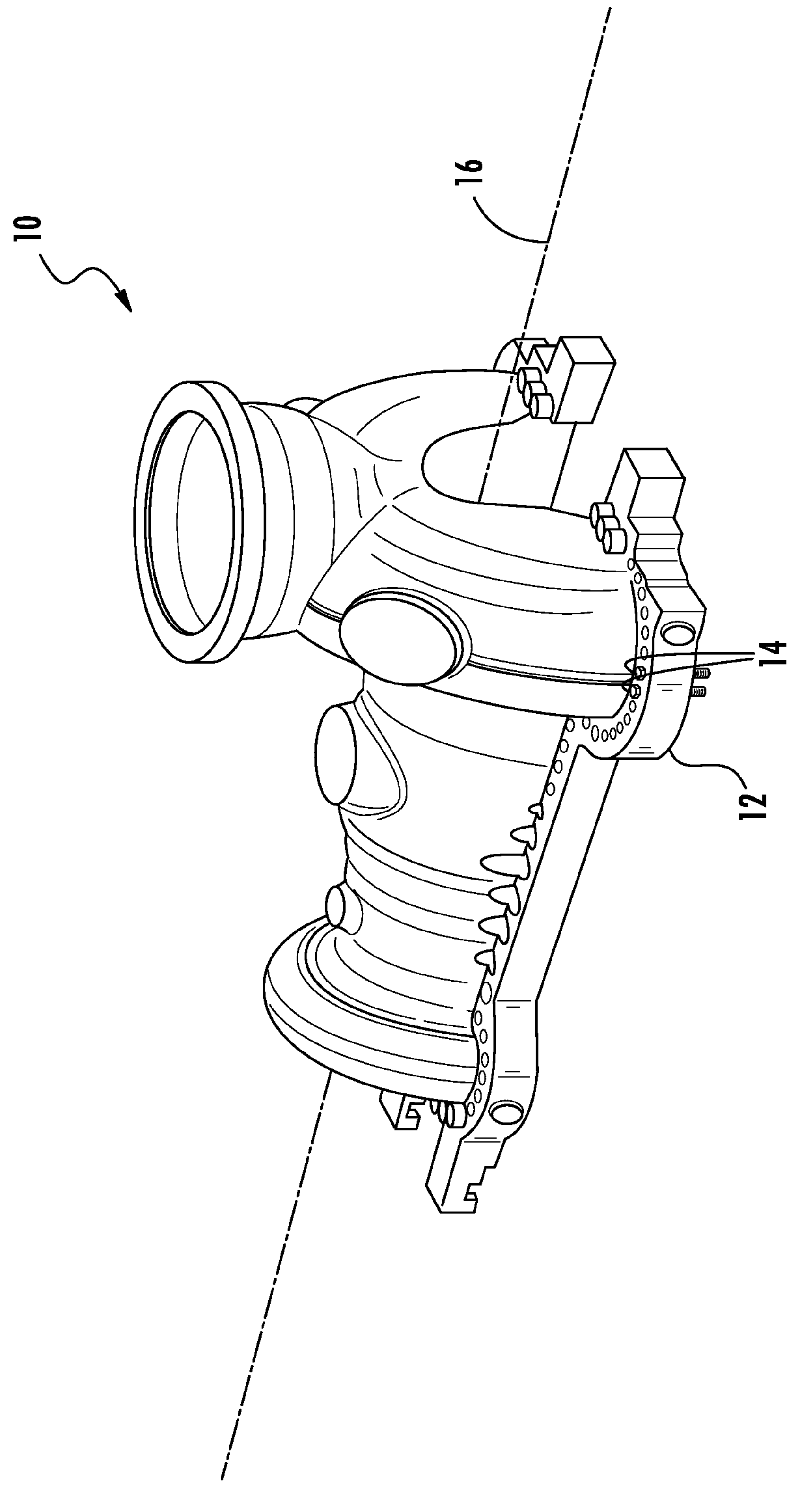
FIG. 1 is a perspective view of an exemplary turbine shell.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms “first”, “second”, and “third” may be used interchangeably to distinguish one component from another and are not intended to signify location or importance of the individual components. In addition, the terms “upstream” and “downstream” refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for rotating a turbine shell. The system generally includes a pair of trunnions rotatably connected to associated platforms. The trunnions are adapted to connect to separate portions of the turbine shell so that rotation of the trunnions rotates the turbine shell. In particular embodiments, the system and method may include means for determining the orientation of the platforms and/or aligning the platforms with respect to one another. Although exemplary embodiments of the present invention will be described generally in the context of a turbine shell for purposes of illustration, one of ordinary skill in the art will readily appreciate that embodiments of the present invention are not limited to rotating a turbine shell unless specifically recited in the claims.

FIG. 1 provides a perspective view of an exemplary turbine shell 10 for illustrating various embodiments of the present invention. The turbine shell 10 generally extends along a length of a turbine and conforms to the outer perimeter of repeating stages of rotating blades and stationary vanes contained therein. In addition, the turbine shell 10 generally includes a circumferential flange 12 that may be used to connect multiple turbine shell 10 sections together to fully enclose the turbine. For example, the exemplary turbine shell 10 shown in FIG. 1 may be placed on top of the turbine, and bolts 14 may be inserted through the circumferential flange 12 to engage with a complementary turbine shell (not shown) underneath the turbine. During maintenance, the bolts 14 may be removed, and a crane, davit, or other lifting device may be used to lift the turbine shell 10 away from the turbine. As shown in FIG. 1, the turbine shell 10 includes an axial center of gravity 16 along the longitudinal axis of the turbine shell 10.

Figure 2:
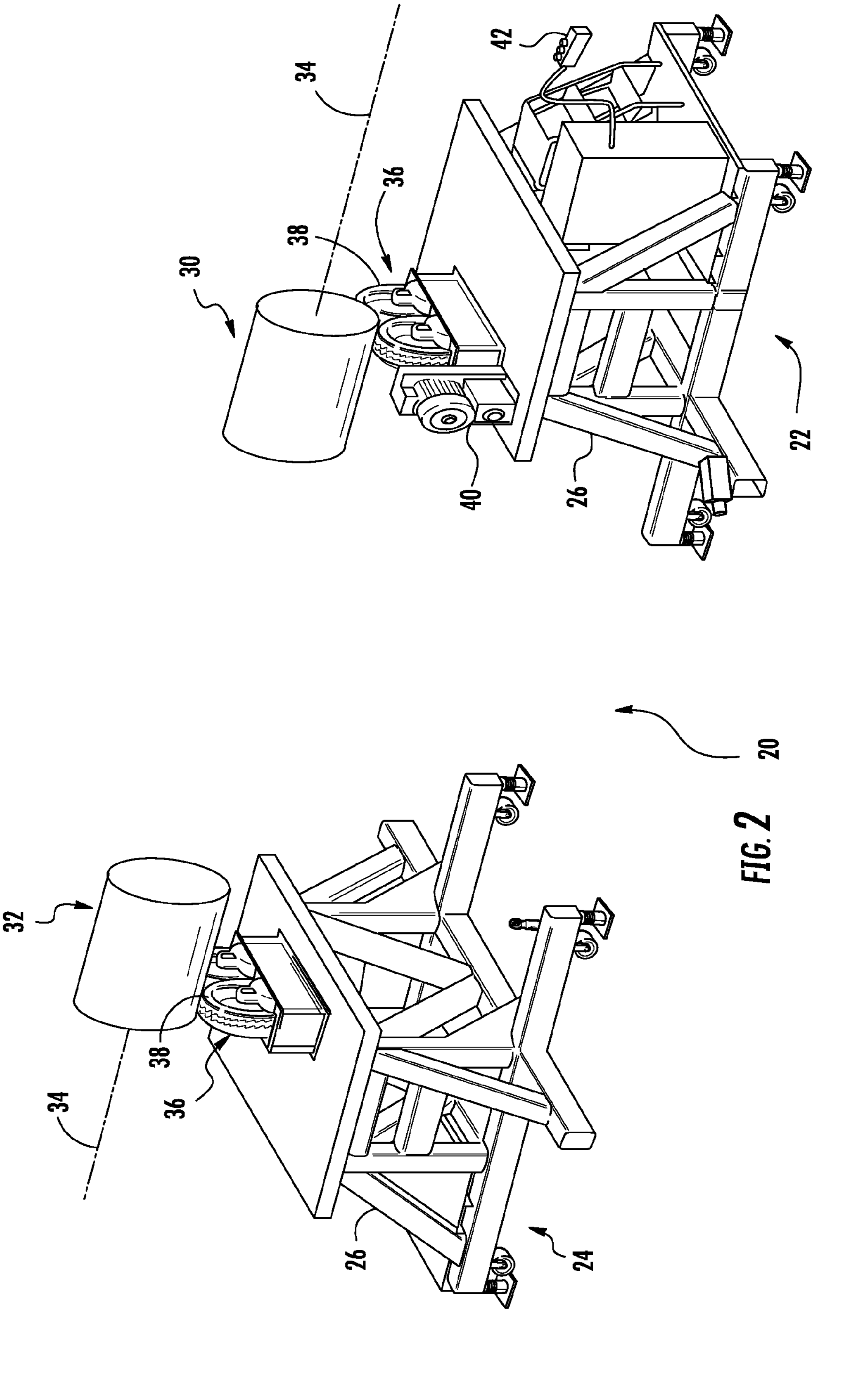
FIG. 2 is a perspective view of a system for rotating a turbine shell according to one embodiment of the present invention.

FIG. 2 provides a perspective view of a system 20 for rotating a turbine shell, such as the exemplary turbine shell 10 shown in FIG. 1, according to one embodiment of the present invention. The system 20 generally includes independent platforms, independent trunnions, and means for rotating one or more of the trunnions. The platforms are physically separated from one another to provide independent locations for each trunnion, and each trunnion is rotatably connected to a separate platform. In addition, each trunnion is configured for or adapted to fixedly connect to a particular portion of the turbine shell. For example, each trunnion may include one or more clamps, bolts, pins, or other structures for fixedly connecting to the turbine shell 10. Once connected to the turbine shell 10, a motor, chain fall, geared connection, or other suitable means may be used to rotate one or more of the trunnions as desired to rotate the turbine shell 10.

In the particular embodiment shown in FIG. 2, for example, a first platform 22 is physically separated from a second platform 24. The platforms 22, 24 may include one or more trusses 26 constructed from suitable materials for supporting the combined weight of the turbine shell 10, trunnions, and associated components. In addition, the platforms 22, 24 may be variously sized to accommodate different sized turbine shells. First and second independent trunnions 30, 32 may be rotatably connected to the first and second platforms 22, 24, respectively. Each trunnion 30, 32 has an axis of rotation 34 so that once the trunnions 30, 32 are connected to the turbine shell 10, rotation of the trunnions 30, 32 will rotate the turbine shell 10.

One or both of the platforms 22, 24 may include means for rotating the trunnions 30, 32. The means may include, for example, a rotatable connection between each trunnion 30, 32 and its associated platform 22, 24 and an electric, pneumatic, or hydraulic motor or other gearing arrangement operably connected to rotate one or both of the trunnions 30, 32. For example, as shown in FIG. 2, a roller 36 between each trunnion 30, 32 and its associated platform 22, 24 may provide the rotatable connection between each trunnion 30, 32 and its associated platform 22, 24. In particular embodiments, the roller 36 may be fixedly attached to each platform 22, 24 and may include one or more wheels 38 to support the trunnions 30, 32 on the platforms 22, 24. In addition, a motor 40 fixedly connected to one or both platforms 22, 24 may be drivingly engaged with the trunnions 30, 32 and/or rollers 36 to rotate the trunnions 30, 32. In the particular embodiment shown in FIG. 2, the system 20 further includes a remote actuator 42 operably connected to the motor 40 so that an operator may remotely operate the motor 40 to rotate one or both trunnions 30, 32.

One of ordinary skill in the art will readily appreciate that the orientation and/or alignment of the platforms 22, 24 with respect to one another directly affects the support provided to the trunnions 30, 32 and the amount of force required to rotate the turbine shell 10. For example, the distance between the platforms 22, 24 must suitably align the rollers 36 under the trunnions 30, 32 so that the rollers 36 can adequately support the trunnions 30, 32. In addition, if the first platform 22 is canted with respect to the second platform 24, the rollers 36 may in turn be angled with respect to the trunnions 30, 32, resulting in an unbalanced load applied by the trunnions 30, 32 on the rollers 36. The unbalanced load on the rollers 36 will in turn require additional force to rotate the trunnions 30, 32 and/or rollers 36.

Figure 3:
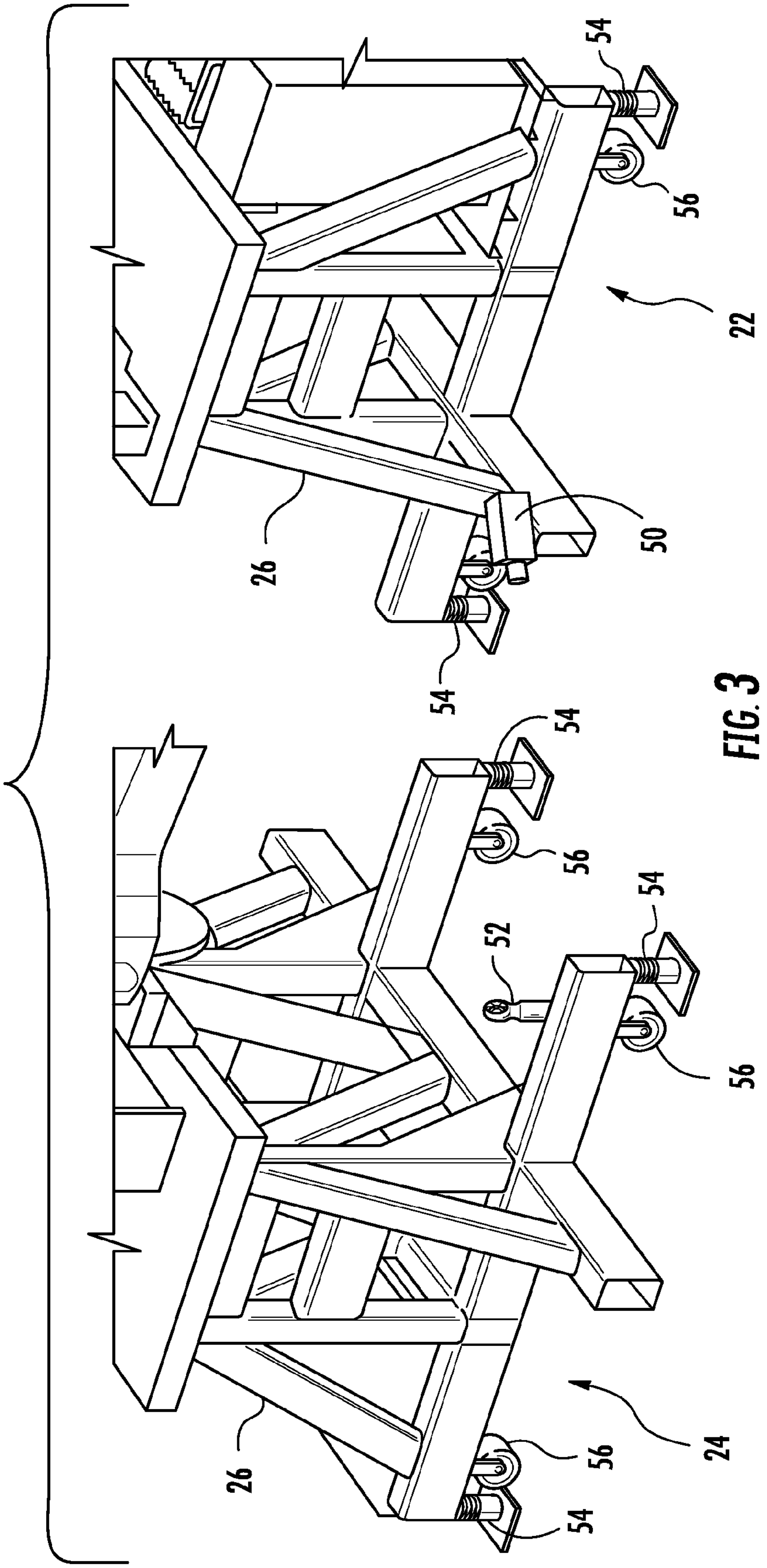
FIG. 3 is an enlarged perspective view of a portion of the platforms shown in FIG. 2.

FIG. 3 provides an enlarged perspective view a portion of the platforms 22, 24 shown in FIG. 2. As shown, the system 20 may further include means for determining a relative orientation between the platforms 22, 24. The function of the means may include, for example, determining a distance between the platforms 22, 24 and/or an axial alignment of one platform 22 with respect to the other 24. The structure for the means may include any mechanical, sonic, optic, magnetic, or geo-positioning device known to one of ordinary skill in the art for accurately measuring a distance, aspect, or location of an object. For example, the structure for determining the relative orientation between the platforms 22, 24 may include a retractable measuring tool, a sonic probe, a laser, a compass, or a geo-positioning system. In the particular embodiment shown in FIG. 3, a laser 50 is fixedly attached to the first platform 22, and the laser transmits an optic pulse which is reflected off the second platform 24 back to the laser 50. In this manner, the laser 50 may determine the distance between the platforms 22, 24 and/or angular position between the platforms 22, 24. Alternately, or in addition, a reflector 52 fixedly attached to the second platform 24 may enhance the reflection back to the laser 50, thereby increasing the precision and/or accuracy of the laser 50.

The system 20 may further include means for aligning the platforms 22, 24 with respect to one another. The function of the means may include, for example, moving one or both platforms 22, 24 in one or more dimensions. For example, the means may raise or lower one or both platforms 22, 24, may move one or both platforms 22, 24 linearly with respect to one another, and/or may rotate one or both platforms 22, 24. The structure for the means may include jacks, wheels, or other devices suitable for supporting and/or moving one or more of the platforms 22, 24. In the particular embodiment shown in FIG. 3, for example, a plurality of jacks 54 and wheels 56 may be operably connected to each platform 22, 24 to allow each platform 22, 24 to be raised, lowered, and moved in any direction. For example, the jacks 54 may be retracted so that the wheels 56 support the platforms 22, 24. The platforms 22, 24 may then be manually positioned as desired to align the first platform 22 with respect to the second platform 24. Once at the desired position, the jacks 54 may be extended as desired to lift one platform 22, 24 with respect to the other and/or to balance or level an individual platform.

Figure 4:
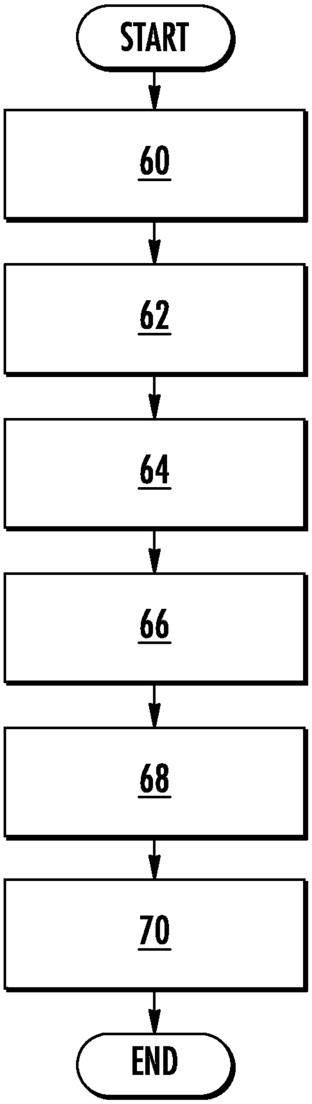
FIG. 4 is a flow diagram of a method for rotating a turbine shell according to one embodiment of the present invention.
Figure 5:
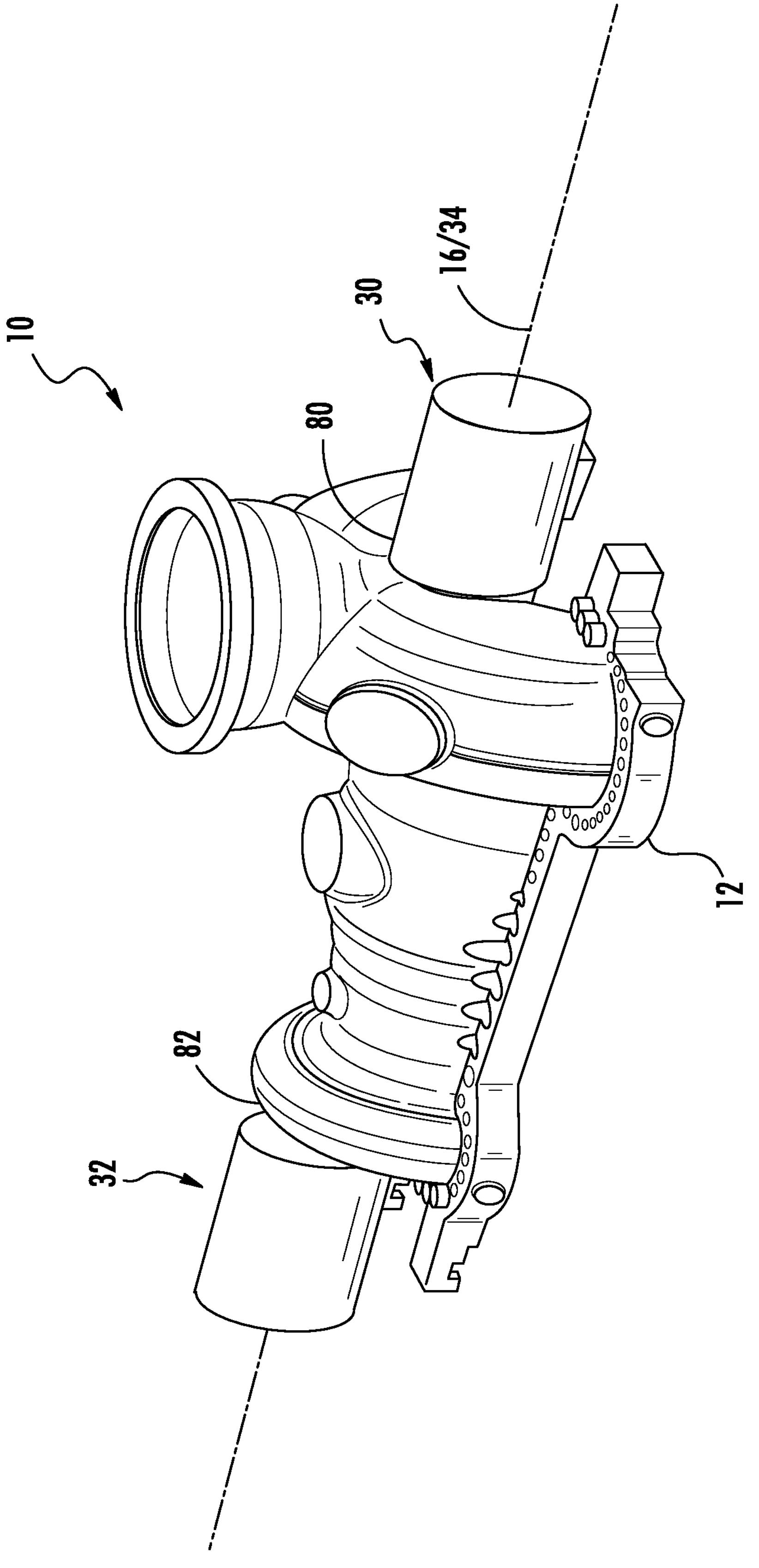
FIG. 5 is a perspective view of the turbine shell shown in FIG. 1 connected to the trunnions shown in FIG. 2.
Figure 6:
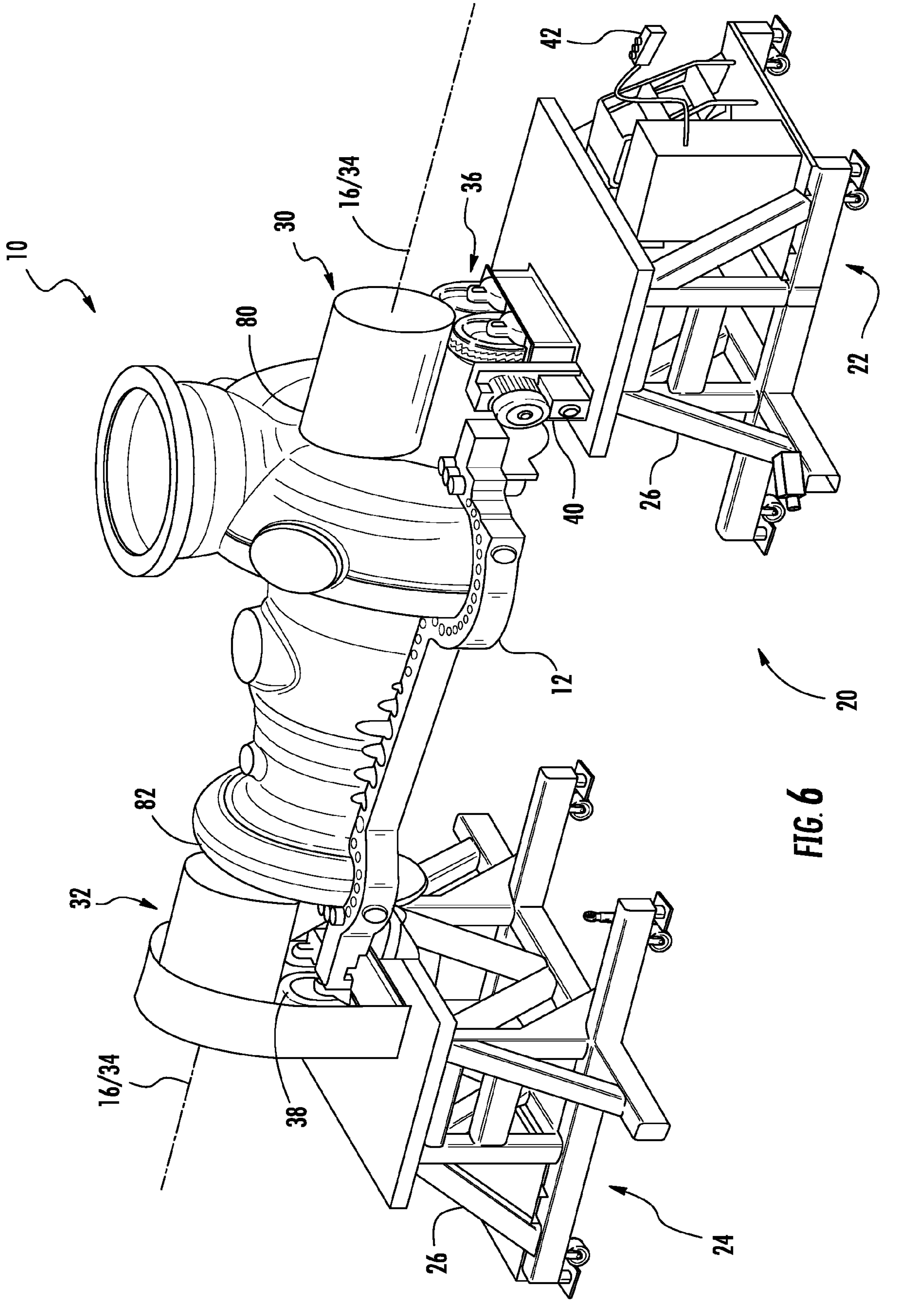
FIG. 6 is a perspective view of the turbine shell and trunnions shown in FIG. 5 placed on the platforms shown in FIG. 2.
Figure 7:
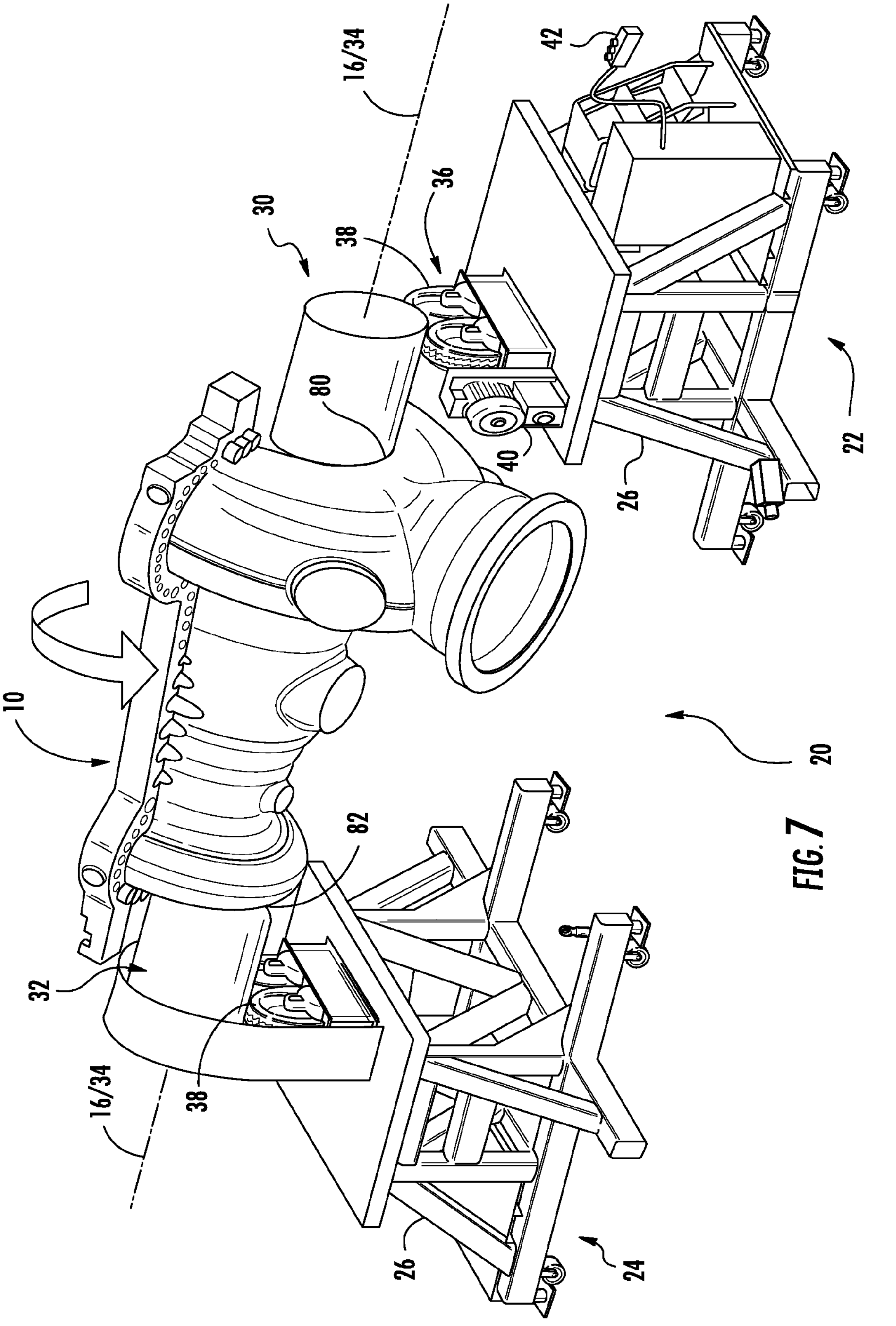
FIG. 7 is a perspective view of the turbine shell shown in FIG. 1 being rotated by the system shown in FIG. 2.

FIG. 4 provides a flow diagram of a method for rotating a turbine shell according to one embodiment of the present invention, and FIGS. 5-7 provide perspective views of the turbine shell 10 shown in FIG. 1 being rotated by the system 20 shown in FIG. 2. At block 60, the turbine shell 10 is disconnected from and removed from the turbine. For example, the bolts 14 may be removed from the flange 12, and a crane, davit, or other device may be used to lift the turbine shell 10 away from the turbine. At block 62, the trunnions 30, 32 are connected to the turbine shell 10. As shown in FIG. 5, for example, the first trunnion 30 may be connected to a first portion 80 of the turbine shell 10, and the second trunnion 32 may be connected to a second portion 82 of the turbine shell 10. The trunnions 30, 32 may be aligned with the turbine shell 10 so that the axial center of gravity 16 of the turbine shell 10 substantially coincides with an axis of rotation 34 for each trunnion 30, 32. In this manner, the weight of the turbine shell 10 will be evenly distributed to each trunnion 30, 32 as the turbine shell 10 rotates.

At block 64, the trunnions 30, 32 are placed on the platforms 22, 24, as shown in FIG. 6. At block 66, the orientation of the platforms 22, 24 may be determined, and at block 68, the platforms 22, 24 may be aligned with respect to one another as previously described and illustrated with respect to FIG. 3 to suitably align the rollers 36 under the trunnions 30, 32. One of ordinary skill in the art can readily appreciate that the steps described by blocks 66 and 68 may be performed before the trunnions 30, 32 are placed on the platforms 22, 24. For example, by knowing the particular dimensions of the turbine shell 10 and the trunnions 30, 32, the platforms 22, 24 may be oriented and aligned before the trunnions 30, 32 are placed on the platforms 22, 24. In this manner, the weight of the platforms 22, 24 will be substantially less than after the trunnions 30, 32 are placed on the platforms 22, 24, reducing the forces required to align the platforms 22, 24. In addition, if desired, the orientation and alignment of the platforms 22, 24 may be repeated after the trunnions 30, 32 are placed on the platforms 22, 24.

At block 70, the motor 40 is energized to rotate the trunnions 30, 32, and thus the turbine shell 10, as shown in FIG. 7.

One of ordinary skill in the art will readily appreciate that the systems and methods described herein will reduce the time required to rotate turbine shells while also reducing the dangers inherent in manipulating such heavy components. Specifically, the systems and methods described herein reduce the time-consuming operations associated with cranes and/or installing and removing scaffolding that might otherwise be required to rotate the turbine shell 10, thus reducing the required time to accomplish the desired maintenance or repairs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for rotating a turbine shell, comprising:
- a. a first platform;
- b. a first trunnion rotatably connected to said first platform, wherein said first trunnion is adapted to connect to a first portion of the turbine shell;
- c. a second platform separated from said first platform;
- d. a second trunnion separated from said first trunnion and rotatably connected to said second platform, wherein said second trunnion is adapted to connect to a second portion of the turbine shell; and
- e. means for rotating said first trunnion.

2. The system as in claim 1, wherein said first trunnion has a first axis of rotation that substantially coincides with an axial center of gravity of the turbine shell.

3. The system as in claim 1, wherein said means for rotating said first trunnion is fixedly connected to said first platform.

4. The system as in claim 1, wherein said means for rotating said first trunnion comprises a roller between said first platform and said first trunnion.

5. The system as in claim 1, further comprising means for rotating said second trunnion.

6. The system as in claim 1, further comprising means for determining an orientation of said first platform with respect to said second platform.

7. The system as in claim 6, wherein said means for determining the orientation of said first platform with respect to said second platform is fixedly attached to at least one of said first or second platforms.

8. The system as in claim 6, wherein said means for determining an orientation of said first platform with respect to said second platform comprises a laser.

9. The system as in claim 1, further comprising means for aligning said first platform with respect to said second platform.

10. The system as in claim 9, wherein said means for aligning said first platform with respect to said second platform is fixedly attached to said first platform.

11. The system as in claim 1, further comprising a remote actuator operably connected to said means for rotating said first trunnion.

12. A system for rotating a turbine shell, comprising:
- a. a first platform;
- b. a first roller on said first platform;
- c. a first trunnion rotatably engaged with said first roller, wherein said first trunnion is adapted to connect to a first portion of the turbine shell;
- d. a second platform separated from said first platform;
- e. a second roller on said second platform;
- f. a second trunnion separated from said first trunnion and rotatably engaged with said second roller, wherein said second trunnion is adapted to connect to a second portion of the turbine shell; and
- g. a first motor operably connected to rotate said first trunnion.

13. The system as in claim 12, wherein said first trunnion has a first axis of rotation that substantially coincides with an axial center of gravity of the turbine shell.

14. The system as in claim 12, wherein said first motor is in driving engagement with said first roller to rotate said first trunnion.

15. The system as in claim 12, further comprising a second motor operably connected to rotate said second trunnion.

16. The system as in claim 12, further comprising means for determining an orientation of said first platform with respect to said second platform.

17. The system as in claim 16, wherein said means for determining the orientation of said first platform with respect to said second platform is fixedly attached to at least one of said first or second platforms.

18. The system as in claim 12, further comprising means for aligning said first platform with respect to said second platform.

19. The system as in claim 18, wherein said means for aligning said first platform with respect to said second platform is fixedly attached to said first platform.

20. The system as in claim 12, further comprising a remote actuator operably connected to said first motor.

* * * * *